(12) United States Patent
Giannetti et al.

(10) Patent No.: US 8,547,588 B2
(45) Date of Patent: Oct. 1, 2013

(54) METHOD AND ARTICLE FOR PROVIDING LAYOUT FLEXIBILITY

(75) Inventors: Fabio Giannetti, Los Gatos, CA (US); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 12/358,508

(22) Filed: Jan. 23, 2009

(65) Prior Publication Data
US 2010/0188705 A1 Jul. 29, 2010

(51) Int. Cl.
*G06K 15/00* (2006.01)

(52) U.S. Cl.
USPC .......................................................... 358/1.18

(58) Field of Classification Search
None
See application file for complete search history.

(56) References Cited

U.S. PATENT DOCUMENTS

| | | | |
|---|---|---|---|
| 5,953,733 A * | 9/1999 | Langford-Wilson | 715/210 |
| 6,826,727 B1 * | 11/2004 | Mohr et al. | 715/235 |
| 7,287,220 B2 | 10/2007 | Kaasila et al. | |
| 7,761,791 B2 * | 7/2010 | Kobashi et al. | 715/253 |
| 2002/0122067 A1 * | 9/2002 | Geigel et al. | 345/788 |
| 2004/0183817 A1 | 9/2004 | Kaasila | |
| 2005/0044526 A1 * | 2/2005 | Kooy | 717/106 |

OTHER PUBLICATIONS

Pageflex Persona—Fiery Version—Quick Start Guide.*
Pageflex Persona—Fiery Version—Quick Start Guide—2002 (No specific date available).*

* cited by examiner

*Primary Examiner* — Marivelisse Santiago Cordero
*Assistant Examiner* — John Wallace

(57) ABSTRACT

The present invention is drawn to an article of manufacture and an associated method for providing layout flexibility. The article of manufacture includes a computer readable storage medium with a computer readable program code capable of accepting an optimal layout and a first modified layout, each within a visual frame of a graphic art program. Each of the optimal layout and the first modified layout include a plurality of visual elements and a variable data element. The computer readable program code is further capable of determining dimensional and layout parameters associated with each of the optimal layout and the first modified layout. Further, the computer readable program code is capable of interpolating variations between the optimal layout and the first modified layout for modifications of the variable data element ranging from the optimal layout to the first modified layout.

17 Claims, 3 Drawing Sheets

METHOD AND ARTICLE FOR PROVIDING LAYOUT FLEXIBILITY

BACKGROUND

Graphic artists are generally very skilled in designing sophisticated and attractive page layouts. A number of graphic art programs are available to assist in creating the page layouts. Occasionally, a page layout may include variable data, and may require support from variable data print applications. Often, a graphic artist prepares a draft of a layout, including one or more variable data elements. When the variable data is included in the draft, for example, as in an email merge, the overall integrity and aesthetics of the layout can be compromised by the included data. The resulting layout may become visibly distorted, have visibly distorted elements, and/or have missing or cut-off portions. However, it would be inefficient for a graphic artist to individually prepare each email or other modification to be up to high aesthetic levels, and would necessarily thwart the purpose of allowing for the inclusion of variable data from the end user.

BRIEF DESCRIPTION OF THE DRAWINGS

FIG. 3a represents an optimal layout and FIG. 3b represents a first modified layout.

DETAILED DESCRIPTION

Figure 1:
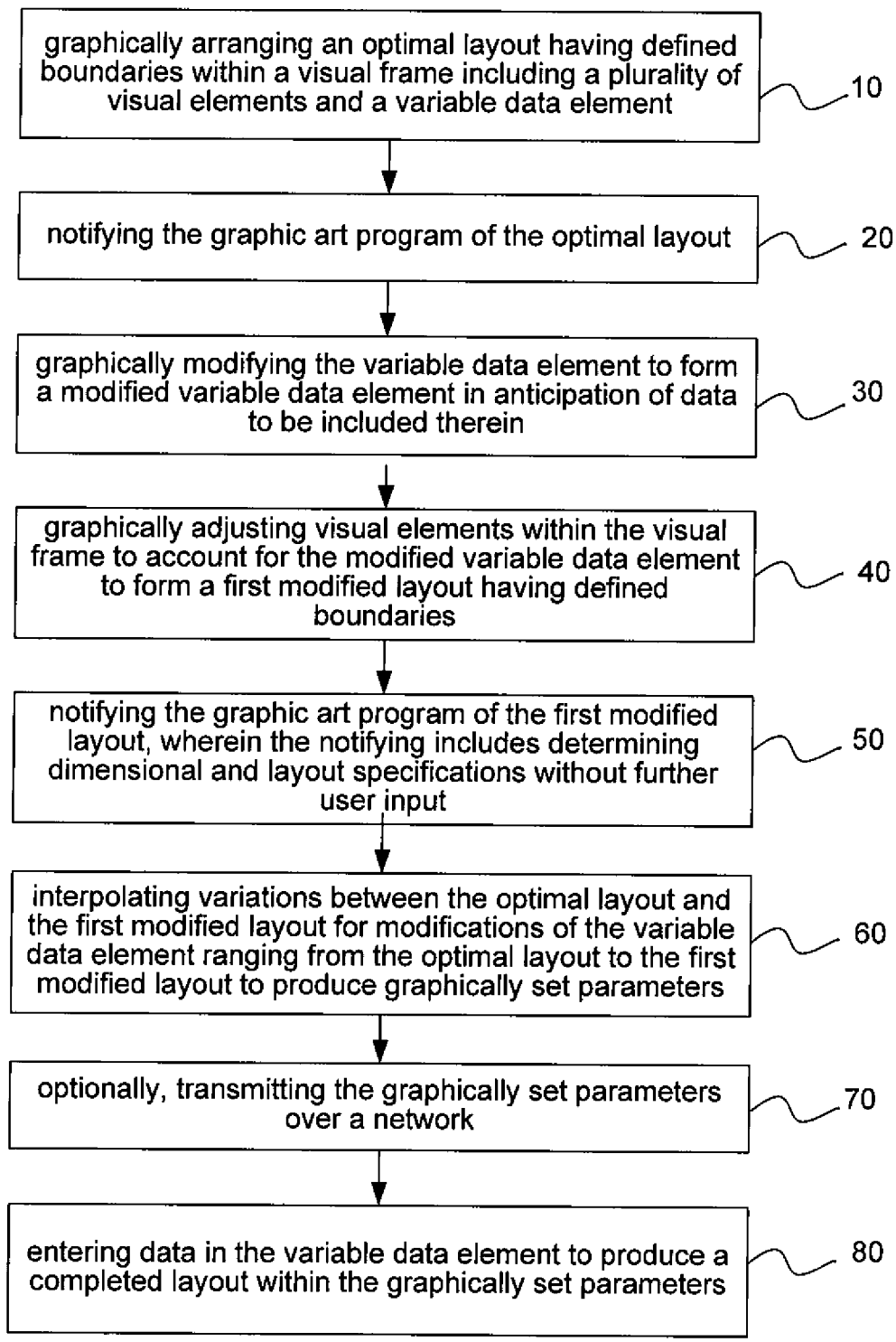
FIG. 1 is a flow diagram of a method of providing layout flexibility in variable data applications in accordance with an embodiment of the present invention.

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

The term, "graphic artist" is used to describe any user of a graphic art program. Therefore, any person using a graphic art program is considered a graphic artist.

A "graphic art program" is used to indicate any electronic program enabling a user or graphic artist to produce digital image layouts which, in turn, can be optionally formed into hard copies (included fixed screen views or physical media). The graphic art programs discussed herein have the capacity to include variable data elements. Such capacity can be inherent in the program itself, or can come from a plug-in, add-on, or other method of upgrading the capabilities of the program. QUARK Xpress and ADOBE DESIGN are examples of graphic art programs.

As used herein, the term "manual" with reference to entering or inputting data, indicates directly entering numerical or other values to effectuate layout or element parameters. For example, this can include defining minimum and/or maximum size by entering numerical values into a program. Alternatively, and in accordance with embodiments of the present disclosure, "graphical" or "visual" entering of data requires manipulation of visual aspects of a layout. These graphically entered or modified parameters can then be used to notify a program of the layout or layout change. The program can then calculate the size ranges allowable within the layout. As such "accepting" layout boundaries can simply include recognition or graphically setting of a layout, and does not include manual entering of parameters of the layout or elements therein.

"Layout parameters" and "element parameters" include any feature of the layout and/or element that can be quantified or calculated. More than one feature is included in layout parameters. For example, layout parameters can include dimensions of size and location of each element within the defined boundaries, and/or dimensions of size of the defined boundaries. Non-limiting examples include dimensions of size, location, location anchoring, element-to-element anchoring, rotation, rotation anchoring, color, height to width ratio, cropping, presence (i.e. addition or removal), shape, etc.

As used herein, layouts are discussed as having "defined boundaries" within a "visual frame" of a graphic art program. If we compare, by way of example, to using MICROSOFT WORD in WINDOWS, if the document view is selected to be in page mode, then each page is shown to have physical boundaries, which would be comparable to defined boundaries of a graphic art program. The WORD window that shows the document is akin to a visual frame discussed with respect to a graphic art program. The visual frame can allow for various magnification levels of the defined boundaries.

"Interpolating" is used herein to reference using a computer program or algorithm to identify optimal layout designs for all points or discrete step-wise points between two different layout configurations, based usually on the variance primarily of one or more variable data elements. Examples of programs or algorithms that are capable of interpolating between two layouts include PAGEFLEX PERSONA and GMC.

In one embodiment, interpolation can be used to provide many possible iterations of design on a continuous spectrum between an optimal layout and a modified layout. Alternatively, the Graphic Artist could create different versions and capture these as steps as approved step-wise iterations between an optimal layout and a modified layout. These steps can be then interpolated together providing a discrete set of alternatives. This latter approach could be really useful for text related properties, such as font sizes (discrete approved font sizes, e.g. 14, 12, 10), leading, and so on.

As used herein, a plurality of items, conditions, and/or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Utilizing variable data elements in document (both electronic and hard copy) creation is a very effective manner of producing a large number of personalized or similarly distinctive copies in a relatively fast manner. Non-limiting examples of documents that can be formed using variable data elements include emails, letters, text and picture messages, posters, papers, brochures, marketing materials, and any other documents that can be printed or otherwise formed, digitally and/or in hard copy form.

Graphic artists invest significant time and creative ability in preparing layouts for use with variable data. Unfortunately, it is often the case that the variable data or customized information retrieved from a database for a particular field may not be consistent from user to user. When the various-sized variable data is entered into the variable data field in the graphic artist's layout, the overall layout is inevitably altered in appearance, thus not retaining the original integrity or aesthetic appeal of the original layout. Unfortunately, modifying all variable data for use in a particular variable data field is often not feasible, and can be resource and time consuming. As such, disclosed herein are an article of manufacture and method for providing layout flexibility to a graphic art program and/or layout including a variable data element. The present method and article allow the graphic artist to manipulate a layout, including one or more variable data elements, in a visible manner to define additional layouts that meet with the graphic artist's approval. The layouts are designed and defined in a visible format, rather than requiring a graphic artist to manually enter code or parameters numerically, or rely on a programmer to enter the code or parameters. In this manner, the modified layouts can be designed visually, and in a manner that is intuitive to the graphic artist and in congruence with the thinking and preference of the graphic artist. Therefore, a graphic artist defined layout can manage a great variety of variable data elements included in the layout, and remain consistent with the graphic artist's vision and intent, while requiring no further review or modification from the graphic artist beyond initially creating a plurality of layouts.

As such, in one aspect, an article of manufacture can include a computer readable storage medium with a computer readable program code capable of accepting an optimal layout and a first modified layout, each within a visual frame of a graphic art program. Each of the optimal layout and the first modified layout include a plurality of visual elements and a variable data element within defined boundaries. The computer readable program code is further capable of determining dimensional and layout parameters associated with each of the optimal layout and the first modified layout. Further, the computer readable program code is capable of interpolating variations between the optimal layout and the first modified layout for modifications of the variable data element ranging from the optimal layout to the first modified layout. In one aspect, the optimal layout can include a plurality of variable data elements. In one embodiment, the computer readable program code can be configured as part of a graphic art program. In another embodiment, the computer readable program code can be configured as a plug-in for a graphic art program.

Similarly, as illustrated in FIG. 1, a method of providing layout flexibility can include graphically arranging an optimal layout having defined boundaries within a visual frame 10. The layout can include a plurality of visual elements and one or more variable data elements. The method further includes notifying the graphic art program of the optimal layout 20. Notifying the graphic art program of the optimal layout can be done in any manner known in the art. Non-limiting examples of modes of notifying the graphic art program include selecting a menu option to indicate an optimal or other layout, and/or hot key use. Non-limiting examples of menus that may be used include those produced from drop-down selection with a key or mouse, menus produced from a click, e.g. right click, of a mouse, visual button selection on a taskbar, and menus displayed continuously, selectively, or semi-continuously within the visual frame or as a separate frame.

The method can further include graphically modifying the variable data element to form a modified variable data element in anticipation of data to be included therein 30. The variable data element can be modified in a number of ways. Non-limiting examples of ways a variable data element can be modified include size, location, anchoring, rotation, color, height to width ratio, border design, scale, and combinations thereof.

In one embodiment, a variable data element can be altered by altering dimensions of size. In this embodiment, the variable data element has at least one dimension (typically height or width) that is larger or smaller than in the optimal or first layout. In another embodiment, the location of the variable data element can be altered. Examples of varying the location include those naturally resulting from a change in size, changing specific placement within a layout, etc. A further embodiment includes varying anchoring. Anchoring can include location anchoring wherein an element is anchored from a point on the element (e.g., corner, middle, etc.), to a specific point within the defined boundaries. A different type of anchoring occurs when elements are anchored together, thus indicating the desired proximity of elements with respect to one another. Another example of anchoring includes rotation anchoring. A variable data element may be rotated around a point of rotation or rotation anchor, which may optionally be varied from one layout to another. Variable data elements can also be altered in rotation. In another embodiment, variable data elements can be altered in color. In still another embodiment, variable data elements can be altered in cropping. In one embodiment, more than one modification to a variable data element occurs. For example, a variable data element can be modified in size and rotation.

In one aspect, the variable data element can be modified according to anticipated variable data. Once the range of parameters of the variable data to be used is identified, it can be relied on to define appropriate modifications to the variable data. One or more layouts can include a variable data in an extreme size and/or shape, such as minimum or maximum. In another embodiment, the variable data element can be modified in response to a difference between boundaries of the optimal or first layout and the defined boundaries of the modified layout. In this embodiment, by way of example, the location of the variable data element may vary while the size stays the same. Such might occur when the layout is for a poster and the poster size is anticipated to change.

Figure 2A:
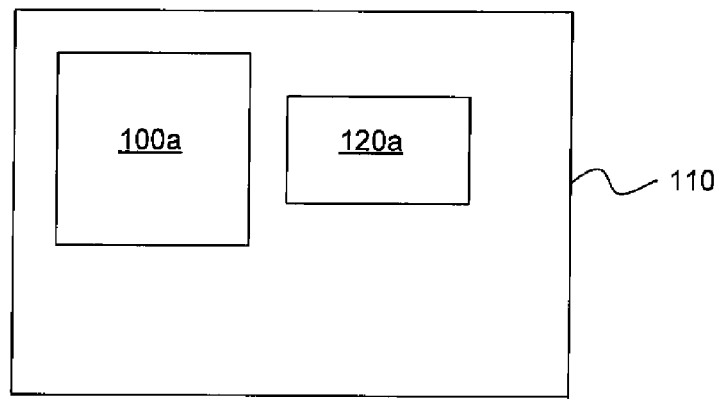
FIG. 2a is an illustration of a page having defined boundaries and a variable data element in an optimal size and shape, in accordance with an embodiment of the present invention.
Figure 2B:
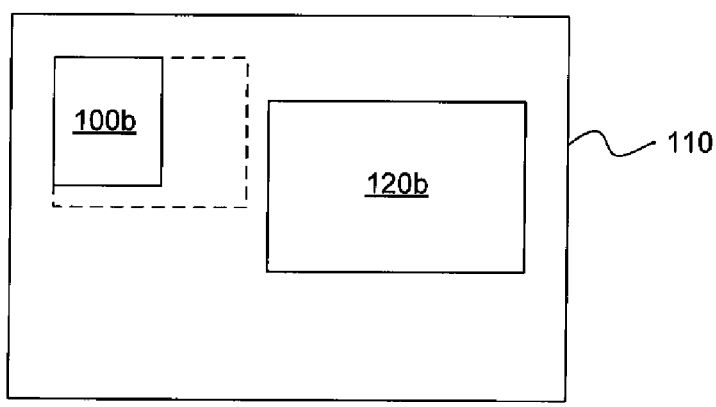
FIG. 2b and FIG. 2c are illustrations of the page of FIG. 2a, wherein the variable data element is reduced and re-shaped in FIG. 2b to a minimum relative size, and enlarged and re-sized in FIG. 2c to a maximum relative size.
Figure 2C:
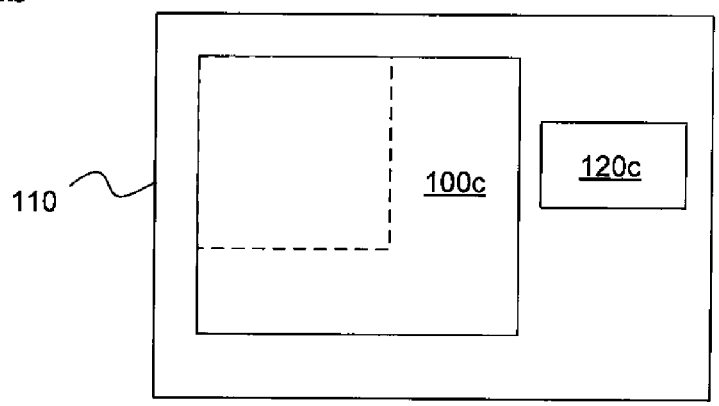

Examples of modifications are illustrated in FIG. 2a-2c. FIG. 2a illustrates an optimal layout including variable data element 100a formatted to an optimal size on a page having defined boundaries 110. The layout further includes a visual element 120a. The variable data element is modified in FIG. 2b. Although the modification as illustrated shows variation to a minimum size for the variable data element 100b, it should be noted that any modification from the optimal layout can be utilized in the present method. The variable data element 100b is also modified in shape, and particularly the height to width ratio. For purposes of better illustrating the modification, an outline of the variable data element 100a of the optimal layout is shown in broken lines. Visual element 120b is shown at an acceptable location and size to the graphic artist when the variable data element 100b is in this configuration. FIG. 2c shows the modification of the variable data element 100c to an opposite extreme, or the maximum size allowable while visual element 120c is still maintained at a minimum size acceptable to the original graphic artist. In this embodiment, if removal of visual element 120c is acceptable to the graphic artist, then a larger size may be set for variable data element 100c, for example. As with FIG. 2b, for purposes of illustration, an outline of the variable data element 100a of the optimal layout is shown in broken lines.

As shown in FIG. 1, the method of providing layout flexibility can further include graphically adjusting visual elements within the visual frame to account for the modified variable data element 40. Once one or more visual elements are adjusted, a modified layout is formed. As shown in FIG. 2b and FIG. 2c, visual element (120a from FIG. 2a) can be modified to a wider shape and size as is the visual element 120b in FIG. 2b or 120c in FIG. 2c, or can be removed from the defined boundaries 110 (not shown), if acceptable to the graphic designer that the visual element be removed completely. Non-limiting modifications to a visual element include all modifications listed for potential modifications to the variable data element, and include modifications to size, shape, location, rotation, addition to the layout, removal from the layout, font, color, and combinations thereof. It should be noted that each visual element can be separately modified in any manner, and often each visual element is modified a number of ways to move from one layout to the next.

With each modified layout, the graphic art program can be notified of the modified layout. As shown in FIG. 1, the method includes notifying the graphic art program of the first modified layout 50. The program can then determine dimensional and layout specifications without further user input. Notification of the layout can be done in any of the methods previously discussed regarding notifying the graphic art program of the optimal layout 20. The mode used to notify the graphic art program of the modified layout can be the same or different from the mode used to notify the graphic art program of the optimal layout.

The method of FIG. 1 further includes interpolating variations between the optimal layout and the first modified layout to produce graphically set parameters 60. There are a number of programs and code that are known in the industry and are capable of interpolating variations between two or more layouts. Any of these programs and/or code as well as any that are developed in the future can be used in conjunction with the present methodology to produce intermediate layouts that can be used when the variable data element is not exactly the size of any of the submitted layouts. The resulting parameters can be of a step-wise form having a number of discrete interpolated layouts, or can be fully scalable. The parameters are considered graphically set as the human interaction of modifying and creating the various layouts is done visually or graphically, without requiring manual entering or coding of parameters of the elements of the layout.

In one embodiment, the graphically set parameters, which include the optimal layout, can be transmitted to an end user, such as over a network (70 of FIG. 1) or from one machine to another. Once the graphically set parameters are received, data can be entered into the variable data element to produce a completed layout within the graphically set parameters 80. If, for example, the desired end product is a number of emails to be personalized, modified for different sending agencies, and sent as part of a marketing campaign, then a graphic artist can include variable data elements for the recipient's name, the sender's company, the sender's company information, the sender's logo, and any other number of distinct fields. Visual elements can include, for example, the main text to be sent, a number of photographs or pictures included in a header and/ or in the middle area of the email. The resulting emails will be of a format approved by the graphic artist, and therefore, are the best product and do not require further interaction with the graphic artist. In one aspect, the graphically set parameters can be sent directly over a network to a user. In another embodiment, the graphically set parameters can be sent to a programmer for activating or coding in the variable data elements.

Figure 3A:
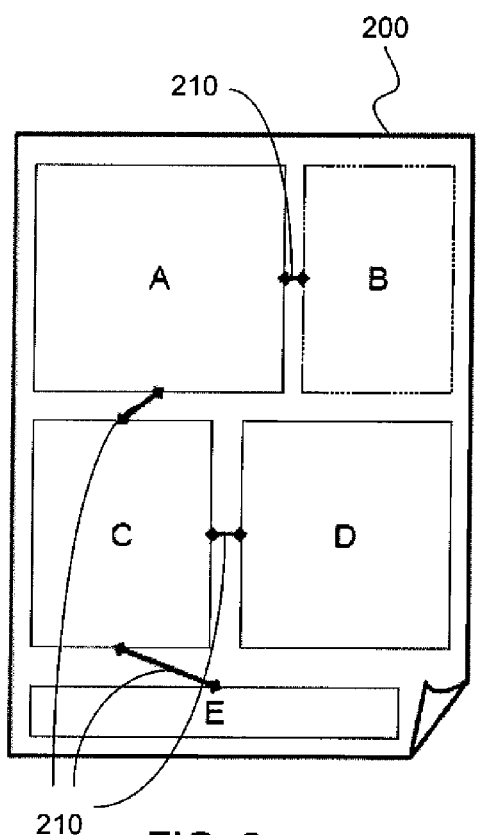
FIG. 3a and FIG. 3b are illustrations of a page having defined boundaries, variable data elements A and E, and multiple visual elements in accordance with an embodiment of the present invention.
Figure 3B:
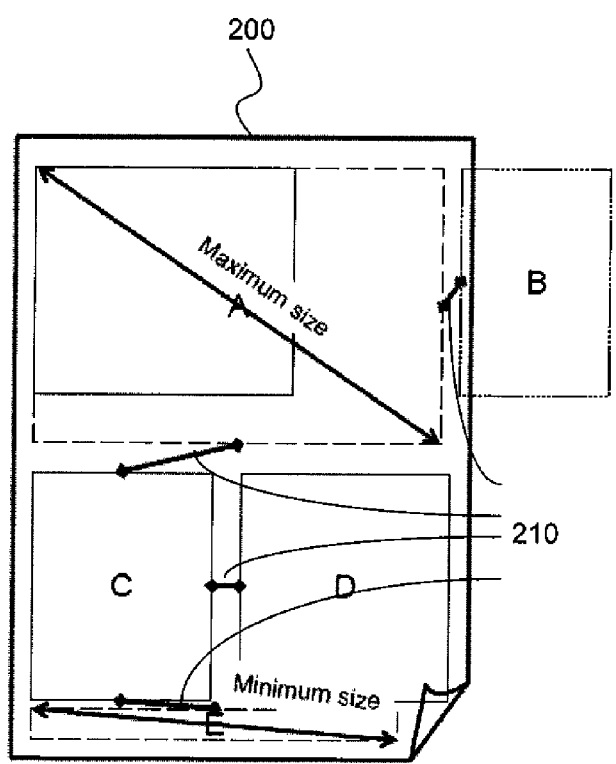

A more intricate layout configuration is shown in FIG. 3a and FIG. 3b. FIG. 3a shows a page having defined boundaries 200 and an optimal layout including variable data elements A and E, and visual elements B, C, and D. In a modified layout shown in FIG. 3b, variable data element A is enlarged to a maximum size, and variable data element E is a minimum size. Both variable data elements are modified in size. The visual elements and variable data elements are connected or anchored as indicated by lines 210. In the modified layout, visual element B is removed from the layout, while visual elements C and D are lowered on the page.

In a specific embodiment, a method of providing layout flexibility in variable data applications within a graphic art program can include arranging a first layout within a visual frame including a plurality of visual elements and a variable data element, wherein the variable data element is a smallest allowable size. The method can then include notifying the graphic art program of the first layout. Further, the method can include modifying the variable data element to a largest allowable size and adjusting visual elements within the visual frame to account for the modified variable data element to form a second layout. The graphic art program can be notified of the second layout, wherein the notifying includes determining dimensional and layout specifications without further user input. From there, the method includes interpolating variations between the first layout and the second layout for modifications of the variable data element ranging from the first layout to the second layout to produce graphically set parameters. The graphically set parameters can be transmitted over a network. The method then includes entering data in the variable data element to produce a plurality of different and completed layouts within the graphically set parameters.

As before, a plurality of variable data elements can be utilized, as can a plurality of layouts. In one aspect, the method can include a plurality of variable data elements. In this embodiment, the steps of modifying the variable data element, adjusting visual elements, and notifying the graphic art program are carried out for each variable data element.

Similarly, the article of manufacture or the method, as previously discussed, can include computer readable program code capable of accepting a second (third, fourth, etc.) modified layout within a visual frame, determining dimensional and layout parameters associated with the second modified layout, and interpolating (step-wise or continuous) variations between the optimal layout and the second (third, fourth, etc.) layout for modifications of the variable data element ranging from the optimal layout to the second modified layout. It is noted that when a second (third, fourth, etc.) modified layout is used, a comparison and/or interpolation between only the optimal layout and the second modified layout can be conducted, or alternatively, a comparison between the optimal layout, the first modified layout, and second modified layout (and third, fourth, etc., if applicable) can be conducted, e.g., update the information based on the optimal layout and the first modified layout. In other words, when discussing comparing the optimal layout to the second modified layout, both embodiments are included.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. An article of manufacture comprising a non-transitory computer readable storage medium having a computer readable program code embodied therein capable of performing the operations of:
    accepting an optimal layout set graphically in response to a notification of the optimal layout, said optimal layout having defined boundaries within a visual frame of a graphic art program, including a plurality of visual elements and a variable data element;
    accepting a first modified layout set graphically in response to a notification of the first modified layout, said first modified layout having defined boundaries within the visual frame, wherein the variable data element and at least one of the visual elements is likewise modified, and wherein the notification of the first modified layout includes a determination of dimensional and layout specifications without further user input;
    accepting for input a selection of a range of discrete step-wise values for the variable data element;
    accepting for input a plurality of visually approved optimal layout variations set graphically between the optimal layout and the first modified layout in response to a notification of the plurality of visually approved optimal layout variations wherein each of the plurality of visually approved optimal layout variations corresponds to a selected discrete step-wise value in a subset of the selected range of discrete step-wise values for the variable data element;
    interpolating the plurality of optimal layout variations between the optimal layout and the first modified layout for said selected range of discrete step-wise values of the variable data element to produce graphically set parameters; and
    accepting data into the variable data element to produce a completed layout within the graphically set parameters.

2. An article of manufacture as in claim 1, wherein the variable data element is modified in size.

3. An article of manufacture as in claim 1, wherein the variable data element is modified in response to a difference between the defined boundaries of the optimal layout and the defined boundaries of the first modified layout.

4. An article of manufacture as in claim 1, wherein the optimal layout comprises a plurality of variable data elements.

5. An article of manufacture as in claim 1, wherein the first modified layout represents an extreme of size for the variable data element.

6. An article of manufacture as in claim 1, wherein at least one visual element that is present in the optimal layout is not present in the first modified layout.

7. An article of manufacture as in claim 1, wherein the computer readable program code is configured as a plug-in for the graphic art program.

8. An article of manufacture as in claim 1, wherein the computer readable program code is further capable of performing the operations of:
    accepting a second modified layout set entered graphically, said second modified layout having defined boundaries within the visual frame, wherein the variable data element and at least one of the visual elements is likewise modified;
    accepting for input an other plurality of optimal layout variations set graphically between the optimal layout and the second modified layout wherein each of the other plurality of optimal layout variations corresponds to a selected discrete step-wise value in a subset of the selected range of discrete step-wise values for the variable data element; and
    interpolating the other plurality of optimal layout variations between the optimal layout and the second modified layout for said selected range of discrete step-wise values of the variable data element.

9. An article of manufacture as in claim 1, wherein variable data is customized information retrieved from a database for a particular field to be included in the variable data element.

10. A method of providing layout flexibility in variable data applications within a graphic art program, comprising:
    graphically arranging an optimal layout having defined boundaries within a visual frame including a plurality of visual elements and a variable data element;
    notifying the graphic art program of the optimal layout;
    graphically modifying the variable data element to form a modified variable data element in anticipation of data to be included therein;
    graphically adjusting visual elements within the visual frame to account for the modified variable data element to form a first modified layout having defined boundaries;
    notifying the graphic art program of the first modified layout, wherein the notifying includes determining dimensional and layout specifications without further user input;
    selecting for input a range of discrete step-wise values for the variable data element;
    graphically arranging a visually approved optimal layout variation between the optimal layout and the first modified layout for a member of the discrete step-wise values in the selected range;
    notifying the graphic art program of the visually approved optimal layout variation for input;
    repeating the graphically arranging the visually approved optimal layout variation step and the notifying of the visually approved optimal layout variation step for a subset of the discrete step-wise values in the selected range;
    interpolating the optimal layout variations between the optimal layout and the first modified layout for said selected range of discrete step-wise values of the variable data element to produce graphically set parameters; and
    entering data in the variable data element to produce a completed layout within the graphically set parameters.

11. A method as in claim 10, further comprising the step of transmitting the graphically set parameters over a network.

12. A method as in claim 10, wherein the first modified layout represents an extreme of size for the variable data element.

13. A method as in claim 10, wherein the variable data element is modified in at least one manner selected from the group consisting of size, location, anchoring, rotation, color, border design, and scale.

14. A method as in claim 10, wherein a visual element is modified in at least one manner selected from the group consisting of size, shape, location, rotation, addition, removal, font, color.

15. A method as in claim 10, wherein the optimal layout includes a plurality of variable data elements.

16. A method as in claim 10, wherein the variable data element is modified in response to a difference between the defined boundaries of the optimal layout and the defined boundaries of the first modified layout.

17. A method as in claim 10, further comprising:
- graphically modifying the variable data element to form a second modified variable data element in anticipation of data to be included therein;
- graphically adjusting visual elements within the visual frame to account for the modified variable data element to form a second modified layout;
- notifying the graphic art program of the second modified layout, wherein the notifying includes determining dimensional and layout specifications without further user input;
- graphically arranging an other visually approved optimal layout variation between the optimal layout and the second modified layout for a member of the discrete step-wise values in the selected range;
- notifying the graphic art program of the other visually approved optimal layout variation for input;
- repeating the graphically arranging the other visually approved optimal layout variation step and the notifying of the other visually approved optimal layout variation for input step for a subset of the discrete step-wise values in the selected range; and
- interpolating the optimal layout variations between the optimal layout and the second modified layout for said selected range of discrete step-wise values of the variable data element to produce second graphically set parameters.

* * * * *